United States Patent

[11] 3,622,691

[72] Inventor John L. Dailey
83 Parkridge Drive, Pittsford, N.Y. 14534

[21] Appl. No. 887,627
[22] Filed Dec. 23, 1969
[45] Patented Nov. 23, 1971

[54] HIGH-SPEED LIGHT-RESPONSIVE TRANSFORM COMPUTER FOR A LIGHT-SENSITIVE PRINTING SYSTEM
21 Claims, 5 Drawing Figs.

[52] U.S. Cl. .......... 178/5.2 A, 178/5.4 CD, 250/217 CR, 340/324.1
[51] Int. Cl. .......... H04n 9/02
[50] Field of Search .......... 178/5.4 CR, 5.4 R, 5.2 A, DIG. 16; 250/217 CR; 340/324.1, 146.3 M

[56] References Cited

UNITED STATES PATENTS

| | | | |
|---|---|---|---|
| 2,434,561 | 1/1948 | Hardy et al. | 178/5.2 |
| 2,872,508 | 2/1959 | Rose | 178/5.2 |
| 2,994,077 | 7/1961 | Terhune | 340/324.1 |
| 3,158,858 | 11/1964 | Ragen et al. | 340/324.1 |
| 3,296,368 | 1/1967 | Lohmann | 250/217 |

*Primary Examiner*—Richard Murray
*Assistant Examiner*—P. M. Pecori

*Attorneys*—James J. Ralabate, Donald F. Daley, Thomas J. Wall and Marn & Jangarathis

ABSTRACT: A light-responsive printing system including a spot of white light scanning a member having red, green and blue colors varying in densities to reflect corresponding light rays therefrom for conversion into corresponding voltages; light-sensitive elements; sources of additional white light variable to intensity in response to other voltage to shine the latter white light onto the respective elements to represent thereon the densities of printing inks of magenta, yellow and cyan colors required to duplicate the densities of the red, green and blue light, respectively, of the member as scanned; and a high-speed light-responsive transform computer for producing the other voltages, comrpising: three transforms one for each of the printing inks, each transform including three groups of cathode-ray tubes, each having three tubes; three groups of photographic films, each group containing three films; each film of each group mounted in proximity of the screen of each tube in each tube group and containing a multiplicity of discrete areas encoded with successively predetermined different degrees of light transparencies in such manner that a summation of the areas of different degrees of light transparencies in each transform film group represents one of the other voltages; and photosensor circuits light coupled to the transform films of the respective transform film groups for translating the light of varying intensities transmitted therethrough into the other voltages.

INVENTOR.
John L. Dailey
BY
Marn & Jangarathis
ATTORNEYS

Fig. 2.
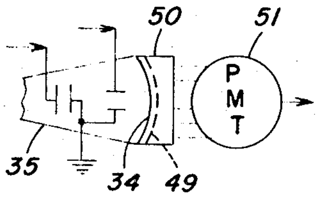
Fig. 3a. Fig. 3b. Fig. 3c.
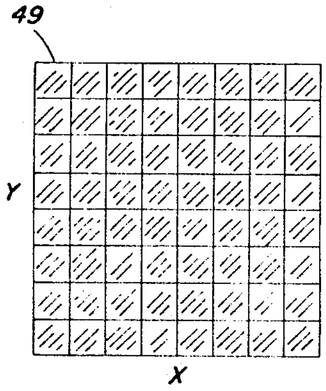
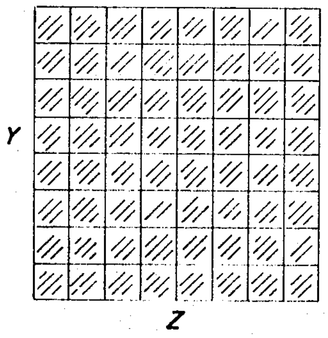
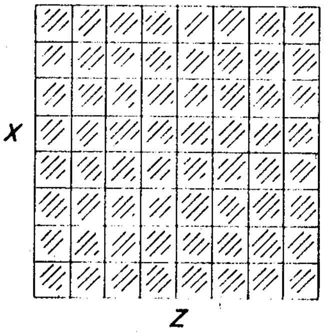
INVENTOR.
John L. Dailey
BY
Marn & Jangarathis
ATTORNEYS

HIGH-SPEED LIGHT-RESPONSIVE TRANSFORM COMPUTER FOR A LIGHT-SENSITIVE PRINTING SYSTEM

This invention relates to a light-responsive printing system, and more specifically to such system embodying a high-speed light-sensitive transform computer as a color correction circuit.

It is known in the color printing art to scan a multicolor document point-by-point in an optical system that resolves the light rays reflected therefrom into red, green and blue components, for example, which are then translated by three phototubes into three corresponding voltages. As the sensitivities of the three phototubes are likely to be unequal in response to equal amounts of input energy, the outputs of the respective tubes are likely to vary as a continuous gray scale, for example, is scanned. Even if the gray scale reflects equal quantities of red, green and blue light, the current outputs of the three phototubes are likely to be unequal. As a consequence, it is necessary to compensate for the unequal sensitivities of the respective phototubes before they are usable in a given color-printing apparatus.

It is also known that the relationships between the phototube outputs and the amounts of cyan, magenta and yellow printing inks required to duplicate the above-noted blue, red and green colors, respectively, are not linear. It is conceivable that a second order relationship between a phototube output and an ink thickness provides a satisfactory reproduction of the green portion in a color spectrum whereas a third order relationship between the phototube output and an ink thickness may be required to provide a satisfactory reproduction of the blue portion of the color spectrum.

Color printers have been long aware that a transform between the color space in which the printer operates is nonlinear. The most sophisticated color scanner utilized heretofore embodies elaborate circuitry intended to include at least some of the second order terms in the transforms. These scanners are not only very expensive to manufacture but are actually rather slow in operation. Depending on a given unit in use at the moment, one-half to 1 full hour is required to scan an 8-inch by 10-inch multicolor sheet. This is for the reason that usually the exposure is performed by flying spot scanners which limit a light source brightness to that of a cathode ray oscilloscope and further that, more critically, the computers involved include a series of operational amplifiers that cannot exceed 1,000 calculations per second, even using solid state components. This is because such amplifiers are iteration devices which perform a kind of damped oscillation about the answer and require time to settle down. Scanning an 8-inch by 10-inch sheet at about 250 lines per inch resolution would require 80 minutes for the calculations mentioned above.

The availability of the laser and the development of small arc xenon sources providing high brightness, together with the development of high-frequency light modulators, make possible the writing on a photosensitive surface at a megacycle rate. In addition, the techniques for writing with an electrographic stylus or an ion gun and the development thereof with 1 xerographic toner are thought to have no discernible upper limit regarding the writing light-responsive printing It would, therefore, appear that the development of a very high-speed color scanner for use in the multicolor-printing art is held back principally because of the lack of a high-speed computer to solve the transform equations at the required high-speed rate.

The present invention is accordingly concerned with the provision of a high-speed light-sensitive computer to perform transforms between two sets of coordinates, one of which is nonlinear with respect to the other, by continuously finding the solution of three simultaneous equations of first, second and third order voltages, at least, at a calculating rate of one million solutions per second or higher in a color correction circuit in a light-responsive-printing system.

A principal object of the present invention is to provide an improved high-speed light-responsive printing system.

Another object is to provide a high-speed color correction circuit for use with a color scanner in a light-responsive printing system. 1 a light-responsive printing A further object is to provide a high-speed light-sensitive transform computer to perform analog calculations at the rate of at least 1 million per second in a color correction circuit in a light-responsive system.

An additional object is to reduce sharply the scanning time in a light-responsive printing system.

Still an additional object is to provide a high-speed light-responsive computer to perform transforms between two sets of coordinates, one of which is nonlinear and the other linear, in a color correction circuit used in a light-responsive printing system.

A still further object is to increase sharply the output of a color correction circuit in a given time interval in a light-responsive printing system.

Still another object is to reduce sharply the time required to produce a set of different color-printing plates.

Still another object is to perform multicolor separations at a high speed in a light-responsive printing system.

A light-responsive printing system includes a scanner utilizing a white light spot to scan a multicolor member containing red, green and blue colors varying in hue, saturation and density to reflect corresponding red, green and blue light rays therefrom in synchronism with first, second and third light-sensitive elements; light filters translating the reflected red, green and blue light rays into plurality of corresponding voltages; and first, second and third sources of variable white light actuable by respectively three other voltages varying in magnitude to shine varying intensities of the white light onto the first, second and third light-sensitive elements, respectively, to represent thereon varying densities of yellow, magenta and cyan inks required to duplicate the densities of the green, red and blue colors, respectively, of the scanned member.

In connection with the foregoing printing system, a specific embodiment of the present invention comprises a high-speed light-sensitive transform computer connecting the outputs of the light filters and the inputs of the variable light sources for producing the three other voltages to actuate the respective light sources.

The specific embodiment of the invention comprises a plurality of cathode-ray tubes arranged in groups, each tube having a cathode, a screen, and horizontal and vertical deflection plates; the cathodes activated by a regulated voltage to provide second white light spots of constant brightness on the screens, each spot provided on one screen; the deflection plates of the tubes in each tube group energized by different combinations of two of the translated voltages to move the second light spots in coordinate patterns on the respective screens of the respective tube groups; a plurality of photographic films arranged in groups; each film of each group containing a multiplicity of discrete squares arranged in a coordinate form and encoded with successively predetermined degrees of light transparencies in such manner that a summation of the squares of different degrees of light transparencies in each film group represents one of the other voltages; each film in each film group mounted on the screen of one tube in each tube group to dispose the squares coordinate forms in accordance with two of the translated voltages in one of the translated voltage combinations and in coextensive relation with the second light spot coordinate pattern on the latter screen; the three films in each film group transmitting therethrough a plurality of discrete groups of light rays varying in intensities and emanating from the second light spots on the respective screens on which the latter film group is mounted.

A plurality of groups of multiplier phototubes light coupled to the respective film groups converts the plurality of groups of light rays derived therefrom into a plurality of groups of output voltages. A plurality of adders, each having inputs connected to the outputs of one phototube group, combines the output voltages of each latter group to form one of the other voltages for activating one of the light sources. The light-exposed elements are then available to make multicolor elements in accordance with a known technique for use in the color-printing art.

The invention is readily understood from the following description taken together with the accompanying drawing in which:

FIG. 2 is a fragmentary box diagram taken between lines R—R and S—S in FIG. 1; and FIGS. 3*photographic* 3*b* and 3*c* squares a family of graphs usable in FIG. 1.

Figure 1:
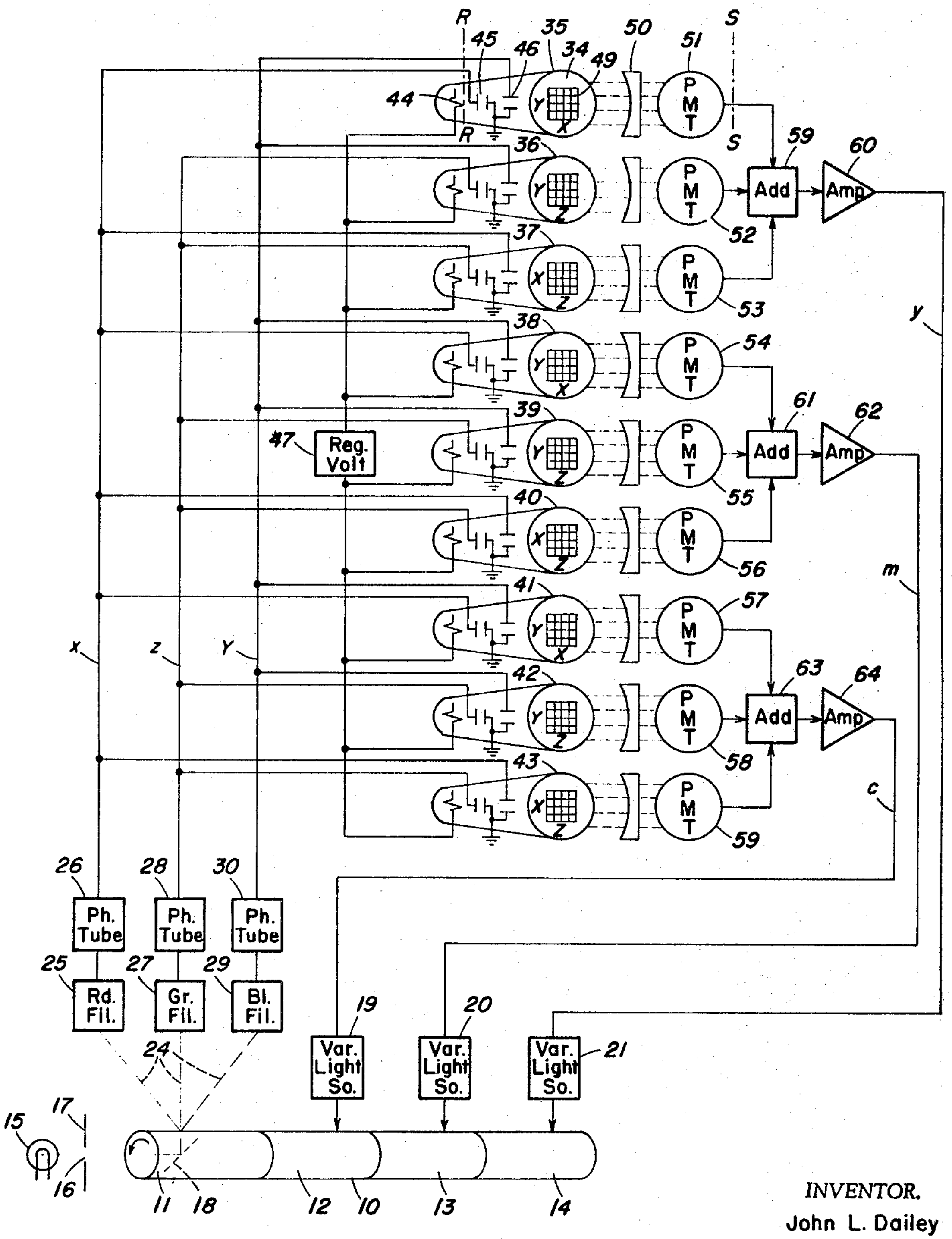
FIG. 1 is a box diagram of a light-responsive printing system including a specific embodiment of the invention.

FIG. 1 includes a mandrel 10 rotatable at a predetermined constant rate of speed in a counterclockwise direction, for example, shown by the arrow. A member 11 including varying hue, saturation and density of red, green and blue colors via attached to the left-hand peripheral section of the mandrel for rotation therewith. This section is understood to be transparent for the purpose of this explanation for a reason optics is presently obvious. In this connection, it is understood that outer member 11 may comprise a reflective copy scanned via reflective optics as known in the art, thereby obviating the requirement of the latter mandrel transparency. A plurality of light-sensitive elements 12, 13 and 14 are mounted in tube relation on the mandrel adjacent to the multicolor member. Each of these elements may comprise a light-sensitive photographic film, a selenium plate, a silver halide plate, or the like. A stationary is also 15 of light applies a photographic of first white light via an opening 16 formed in a fixed opaque element 17 and a mirror 18 mounted interiorly of the mandrel onto the multicolor member as the mandrel is rotated. As a consequence red, green and blue light rays 24 are reflected from the multicolor member. Sources 19, 20 and 21 of variable white light are mounted in proximity of the elements 12, 13 and 14, respectively, for a purpose that is later mentioned. It is understood that the mirror and the light sources 19, 20 and 21 are fixed in position while the mandrel is rotating and moving in a lateral direction at the same time for this explanation; and alternatively, the mirror and the light sources 19, 20 and 21 may be simultaneously moving in a lateral direction while the mandrel is rotating in the same position, for a purpose that is subsequently indicated. It is therefore obvious that the scanning light spot and the elements 12, 13 and 14 are synchronized at all times.

A light filter 25 exposed to the reflected light rays 24 extracts therefrom the red light rays which are then applied to a phototube 26 for translation into a voltage *X* for use as hereinafter explained. A light filter 27 exposed to the reflected light rays 24 extracts therefrom the green light rays which are supplied to a phototube 28 for translation into a voltage *z* for use as later mentioned. A light ray filter 29 exposed to the reflected light rays 24 extracts therefrom the blue light rays which are applied to a phototube 30 for translation into a voltage Y for use as subsequently explained.

The variable light sources 19, 20 and 21 actuated by three other voltages *c*, *m* and *y* varying in magnitude and generated in accordance with the invention as described below shine white light of varying intensities onto the photosensitive surfaces of the first, second and third elements 12, 13 and 14, respectively, for a purpose that is presently explained.

In accordance with a specific embodiment of the invention, a high-speed light-sensitive transform analog computer included in a color correction circuit connecting the outputs of phototubes 26, 28 and 30 and the inputs of the light sources 19, 20 and 21 comprises the following components for producing the three other voltages *c*, *m* and *y* in a manner that is subsequently explained. A plurality of cathode ray oscilloscope tubes 35 through 43, each including a screen 34, a cathode 44, a pair of horizontal deflection plates 45 shown by two parallel vertical lines of which one is connected to ground and a pair of vertical deflection plates 46 indicated by two parallel horizontal lines of which one is connected to ground. A source 47 of regulated voltage simultaneously drives the cathodes of all tubes 35 through 43 to provide therein electron beams of constant intensity and spots of constant brightness on the screens of the latter tubes. Tube 35 has second plates of its horizontal and vertical deflection plates energized by voltages *x* and y, respectively. Tube 36 has second plates of its horizontal and vertical deflection plates energized by voltages *z* and y, respectively. Tube 37 has second plates of its horizontal and vertical deflection plates energized by voltages *z* and x, respectively. Tubes 38, 39 and 40 and 41, 42 and 43 have second plates of their horizontal and vertical deflection plates connected to ground and energized by the voltages *x*, Y and *z* in the manner of tubes 35, 36 and 37, respectively. It is understood that each of tubes 35 through 43 energized by two of the voltages just identified moves the spot of further white light of constant brightness on the screen thereof in a coordinate pattern. Phosphor, not shown, having a very short persistance is applied to the inner surface of each tube screen, preferably a type of phosphor decaying to less than 10 percent after activation by the electron beam associated therewith.

A photographic film 49 including a preselected number of equal squares arranged in a coordinate form as indicated in FIG. 3*a*, for example, is mounted on the external surface of the screen of tube 35 in such manner that the film coordinate squares are coextensive with the spot light coordinate pattern on the latter tube screen as indicated via the dot-dash line in FIG. 1 and in accordance with the two voltages of each voltage combination utilized to energize the tube deflection plates. A fiber optics faceplate 50 having a concave inner surface and a flat outer surface is mounted on the film 49 as shown in FIG. 2. The concave surface of the optics plate permits an accommodation to the electron optics inside the tube and to the visible light optics outside the tube without permitting the moving light spot on the tube screen to spread into unwanted areas thereabout. It is understood that the external of each of the remaining tubes 36 through 43 is also provided with a similar discrete photographic film and a fiber optics faceplate in the manner of tube 35. The purpose of mounting the discrete films on the screens of the tubes 35 through 43 is presently explained.

A multiplies phototube 51 of familiar structure has its face positioned in proximity of the flat face of the optics faceplate on tube 35 to effect light ray coupling therewith as illustrated in FIG. 2. The function of the latter phototube is to translate the white light rays of varying intensity emanating from the film on the screen of tube 35 into a corresponding voltage of varying magnitude in the usual manner. Other phototubes 52 through 59 identical with phototube 51 are similarly positioned in proximity of the flat faces of the optics faceplates on the remaining tubes 36 through 43, for a similar function. The output voltages of the multiplier phototubes 51, 52 and 53 combined in an adder 59 whose output voltage amplified in amplifier 60 appear as a voltage *y* of varying magnitude for application to the input of the variable light source 21. The output voltages of multiplier phototubes 54, 55 and 56 combined in adder 61 and amplified in amplifier 62 appear as a voltage *m* of varying magnitude for application to the input of the variable light source 20. The output voltages of multiplier phototubes 57, 58 and 59 combined in adder 63 and amplified in amplifier 64 appear as a voltage *c* of varying magnitude for application to the input of the variable light source 19.

The plurality of photographic films comprises nine in number, each including a multiplicity of equal squares arranged in a coordinate form. The nine films are divided into first, second and third groups, each referenced to one of the inks of the cyan, yellow and magenta colors and containing three films. The squares of the first film in group one are encoded in such manner that the first film varies in white light transmission therethrough in a vertical direction according to the manner in which the portion of the mathematical transform which is written in terms of the red component or the red-green cross-products of the input image spot being scanned at the moment and which describes the cyan component of the desired image varies according to the amount of red light in the image spot being scanned, while the amount of film transmission of light varies in the horizontal direction as the same portion of the transform varies according to the amount of green light in the image spot being scanned at the same moment. Therefore, the transmission of the white light through the squares of the first film of the first group is described mathematically by the first through the 11th terms of the equations (2) and (3) given hereinbelow, the values of $x$ and Y in the latter equations being represented by distances of the squares from a rest position.

The squares of the second film in film group one are encoded in such manner that the second film varies in the transmission of light therethrough in a vertical direction according to the manner in which the portion of the mathematical transform which is written in terms of the green component or blue-green cross-products of the inputs image spot being scanned at the moment and which describes the cyan component of the desired image varies according to the amount of green light in the image spot being scanned at the moment, while the amount of film transmission of light varies in the horizontal direction as the same portion of the transform varies according to the amount of blue light in the image spot being scanned at the same moment. Hence, the transmission of the white light through the squares of the second film of the first group is described mathematically by the 12th through the 22nd terms of the equations (3), (4) and (5) given hereinbelow, the values of Y and $z$ and $x$ in the later equations being represented by the distances of the squares from a rest position.

The squares of the third film in film group one are encoded in such manner that the third film varies in the transmission of light therethrough in a vertical direction according to the manner in which the portion of the mathematical transform which is written in terms of the blue component or red-blue cross-products of the input image spot being scanned and which describes the cyan component of the desired image varies according to the amount of blue light in the image spot being scanned at the moment while the amount of film transmission varies in the horizontal direction as the same portion of the transform varies according to the amount of red light in the image spot being scanned at the moment. Accordingly, the transmission of the white light through the squares of the third film of the first group is described mathematically by the 23rd through the 33rd terms of the equations (5), (6) and (7) given hereinafter, the values of $x$ and $z$ in the equations being represented by the distances of the squares from a rest position. It is thus seen that the three films of film group one are referenced to the cyan ink.

What has been said about the first, second and third films of the first film group applies exactly to the fourth, fifth and sixth films constituting the second film group, and referenced to the magenta ink. Therefore, the individual densities of the squares of the fourth film in the second film group are described mathematically by the first through 11th terms of the equations (11) and (12) given hereinafter, of the fifth film in the second film group by the 12th through 22nd terms of the equations (12), (13) and (14) given later, and of sixth film in the second film group by the 23rd through 33rd terms of the equations (14), (15) and (16) given below.

Additionally, the seventh, eighth and ninth films constituting the third film group are organized similarly to the first, second and third films, respectively of the first film group, except that the films of the third group are referenced to the yellow ink. Therefore the individual densities of the squares of the seventh film in the third group are described by the first through the 11th terms of the equations (20) and (21) given hereinbelow, of the eighth film in the third group by the 12th through 22nd terms in the equations (22), (23) and (24) given below, and of the ninth film of the third group by the 23rd through 33rd terms of the equations (24), (25) and (26) given later.

Each of the first through ninth films is individually mounted upon the screen of one of cathode-ray tubes, one through nine.

A first step looking toward tb design of the transform computer according to the invention is to determine the particular transform to be solved. As previously stated herein, the color scanner output voltages $x$, Y and $z$ of varying magnitudes represent the varying characteristics of the red, blue and green light rays, respectively, reflected from the multicolor member as scanned; and the adder output voltages $y$, $m$ and $c$ of varying magnitude control the modulation of the light sources 21, 20 and 19, respectively, for shining the correspondingly varying amounts of white light onto successive points of elements 14, 13 and 12 associated therewith.

As the colors formed by the printing inks available to the color-printing art include the entire gamut of colors on the member 11 in FIG. 1 as scanned, it is assumed that for any combination of the $x$, Y and $z$ voltages there is a conjugate combination of $y$, $m$ and $c$ voltages. In the following description, it is understood that a one to one relationship is contemplated, and that if and when a halftone relationship is desired, then suitable halftone equipments, not shown, are inserted between the variable light sources 19, 20 and 21 and the elements 12, 13 and 14, respectively, in a manner well known in the printing art. That is to say, the hue, saturation and density or shading of the color spot on the multicolor member 11 as scanned at the moment are completely defined by the voltages $x$ Y and $z$ produced at the same moment, and the amounts of yellow, magenta and cyan printing inks that must be mixed to duplicate such scanned color spot may be calculated mathematically. The circuits of FIG. 1 for processing the voltages $x$, Y and $z$ to provide the voltages $y$, $m$ and $c$ constitute effectively an analog computer.

It is assumed that the relationship between the voltages $x$, Y and $z$ and the voltages $y$, $m$ and $c$, is a transform of the first through third orders for the purpose of this description. The mathematical calculations of the three orders of voltage required for the respective transforms defining the voltage $y$ utilized to control the variable light source 21, for example, is represented by the Y–$x$, Y–$z$ and $x$–$z$ graphs shown in FIGS. 3$a$, 3$b$ and 3$c$, respectively. The range of magnitudes of the voltages that may be applied to the variable light source 21 for the purpose of the instant description is divided into a series of equal increments. As most printing processes are limited to approximately 15 steps of the gray scale, a set of 15 voltages equally spaced with regard to different magnitudes is provided.

These voltages in every possible combination of different magnitudes are thereafter applied to the three variable light sources 19, 20 and 21 to expose the photosensitive surfaces of the elements 12, 13 and 14, respectively, in such manner that every combination of printing ink densities is represented when the elements are ultimately proof-printed in the manner known to the printing color art. Multiple sets of elements may be used, if necessary. If the elements are of a familiar lithographic type, contact halftone screens, not shown, oriented at the customary angles may be placed over the elements in the mandrel to convert the image to a halftone format. The three proofsheets resulting from this process and including discrete areas representing specific ink densities are then placed between the member 11 and the filters 25, 27 and 29, one proofsheet in front of each filter, to simulate the light rays 24, and the system in FIG. 1 is operated to produce the voltages $x$, Y and $z$, each for one discrete square of one proofsheet. The magnitude of each of these voltages is measured. The magnitude of each of the voltages $c$, $y$, $m$ which were initially used to make the exposures of the elements as just mentioned are noted and written beside a corresponding one of the measured voltages, $x$, Y, $z$. The result is a tabulated form of the transform between the analyzed input color, represented by the voltages $x$, Y and $z$ and the exposures of the corresponding voltages $c$, $y$, and $m$ required to effect the elements to duplicate the analyzed input colors. The table contains sufficient datum points that, by interpolation, the unique transform from any specific $x_i$, $Y_i$, $z_i$ to its cognate $c_i$, $y_i$, $z_i$ may be found accurate to the third order.

All of the datum points are then used as an input to a digital computer, not shown, which is programmed to find the values of the numerical coefficients $a_{i_j}$ of the mathematical transforms given below in equations (2) through (8), (11) through (17) and (20) through (26). A datum point is the relation between a specific set of voltages *x*, Y and *z* and a second set of voltages *c*, *y* and *m* which are unique for one another in this system. This relationship is determined by applying the values for *c*, *y*, *m* to the points 19, 20 and 21, respectively, in FIG. 1 and using the resulting color separation to print a specimen color which is examined by scanning in a reflection mode to determine what values of *x*, Y, *z* are produced at the points 26, 28 and 30, respectively, in FIG. 1. Multiple sets of *c*, *y*, *m* are used to produce many different specimens of color to produce many datum points.

After the numerical coefficients have been determined, three sheets of photographic film are then placed sequentially under a variable source of light, not shown, arranged to expose one given square area at a time, the positions of the squares being related in coordinate form to the voltages *x*, Y, *z* in the manner described previously. The computer, equipped with the given transform equations (2) through (8), into which the determined coefficients for the yellow transform have been inserted, solves the equations in sections, using the first 11 terms in the equations (2) and (3) in the first instance, the second 11 terms in equations (3), (4) and (5) in the second instance and the third 11 terms in equations (5), (6) and (7) in the third instance. Terms beyond the 33rd term in equation (7) may be disregarded. Solutions are then made by inserting discrete values of the voltages *x* and Y in the terms 1 through 11 in the equations (2) and (3) in the first instance, of the voltages Y and *z* in the terms 12 through 22 in the equations (3), (4) and (5) in the second instance, and of the voltages *x* and *z* in the terms 23 through 33 in equations (5), (6) and (7) in the third instance, the individual values being determined by the position of the square of film to be exposed.

When the numerical value of a solution has been found, the computer activates the variable source of light to expose the film in such manner that, after development, the transmission of light through the film is linearly proportional to the calculated value of the equation segment for the specified values of the variables. After all three films are developed, they have recorded thereon a most precise pattern of the density values of the yellow ink required to be used to duplicate any color within the available gamut of the printing process used, and may be used to determine the required value of the voltage *y* as hereinafter explained.

In a similar manner, two groups of films, are provided to produce the voltages *m* and *c* of continuously varying magnitude required to activate the variable light of correspondingly varying intensity onto the light-sensitive surfaces of the elements 13 and 12, respectively, thereby to indicate the varying densities of magenta and cyan-printing inks that are required to duplicate the varying densities of the red and blue colors, respectively, of the continuously scanned member. For this purpose, for example, the computer solves the equations (11) through (17) by using the terms 1 through 11 in equations (11) and (12), the terms 12 through 22 in equations (12), (13) and (14), and the terms 23 through 33in equations (14), (15) and (16) to produce the fourth, fifth and sixth films, respectively, of the second film group for mounting on the external surfaces of the screens of respective tubes 38, 39 and 40 in order to produce the voltage *m* varying in magnitude. Again, terms beyond the 33rd term in equation (16) are disregarded. Similarly, the computer solves the equations (20) through (26) by using the terms 1 through 11 in equations (20) and (21), the terms 12 through 22 in equations (21), (22) and (23) and the terms 23 through 33 in equations (23), (24) and (25) to produce the seventh, eighth and ninth films, respectively, of the third film group for mounting on the external surfaces of the screens of the respective tubes 41, 42 and 43 in order to produce the voltage *c* varying in magnitude. For this purpose the terms beyond the 33rd term are disregarded.

Each film in each of the three groups thereof is marked to indicate the successively different magnitudes of voltages *y*, *m* or *c* that were required to make it; and each latter film is marked with the successively different magnitudes of voltages *x*, Y or *z* that the latter film produces. It is thus apparent that for any combination of voltages *x* Y and *z* there is a conjugate combination of voltages *y*, *m* and *c*. It is additionally apparent that the overall light-sensitive transform computer consists essentially of the nine discrete films 49 shown in FIG. 1 and representing, when summed in groups of three, the voltages *y*, *m* and *c*. The production of the nine transforms is further explained below.

The general form of the overall transform computer is available by simply assigning undetermined coefficients to each term in the expansion of equation $$c_1 m_1 y_1 = (x+y+z)^n \quad (1)$$

when *n* is the order of transform, In the equations below, it is assumed $n=4$.

The transform for color cyan *c* is:

$$c = a_{c_1}x + a_{c_2}x^2 + a_{c_3}x^3 + a_{c_4}x^4 + a_{c_5}xY + a_{c_6}x^2Y + a_{c_7}xY^2 \quad (2)$$

$$+ a_{c_8}x^2Y^2 + a_{c_9}x^3Y + a_{c_{10}}xY^3 + a_{c_{11}}x^2Y^2 + a_{c_{12}}Y + a_{c_{13}}Y^2 \quad (3)$$

$$+ a_{c_{14}}Y^3 + a_{c_{15}}Y^4 + a_{c_{16}}Yz + a_{c_{17}}Y^2Z + a_{c_{18}}Yz^2 + a_{c_{19}}Y^2z^2 \quad (4)$$

$$+ a_{c_{20}}Y^3z + a_{c_{21}}Yz^3 + a_{c_{22}}Y^2z^2 + a_{c_{23}}z + a_{c_{24}}z^2 + a_{c_{25}}z^3 \quad (5)$$

$$+ a_{c_{26}}z^4 + a_{c_{27}}xz + a_{c_{28}}xz^2 + a_{c_{29}}x^2z + a_{c_{30}}x^2z^2 + a_{c_{31}}x^3z \quad (6)$$

$$+ a_{c_{32}}xz^3 + a_{c_{33}}x^2z^2 + a_{c_{34}}xYz + a_{c_{35}}x^2Yz + a_{c_{36}}xY^2z \quad (7)$$

$$+ a_{c_{37}}xYz^2 \quad (8)$$

It is understood that the first, second and third films of the first film group representing the terms 1 through 11, 12 through 22, and 23 through 33, respectively, in the equations (2) through (7) as above noted are suitably affixed to the external surfaces of the screens of the respective tubes 35, 36 and 37 in such manner that the coordinate squares of the individual films are accommodated to the coordinate movements of the electron beams of the latter tubes. As a consequence, the first, second and third films transmit varying intensities of white light therethrough to produce the voltage *y* of a continuously varying magnitude to activate the variable light source 21 to shine white light of correspondingly varying intensity onto the light-sensitive surface of the element 14 thereby to indicate the varying density of yellow printing ink that is required to duplicate the varying density of the green color of the continuously scanned member.

After all of the coefficients are determined in the foregoing equations, the transform may be laid out in two dimensional form and rewritten as follows:

$$c = f_1(x,Y) + f_2(Y,z) + f_3(x,z) + zf_4(x,Y) + xf_5(\mathbf{Y},\mathbf{z}) \quad (9)$$

where $f_1(x,Y)$ contains the terms $a_{c_1}$ through $a_{c_{11}}$, $f_2(Y,z)$ the term $a_{c_{12}}$ through $a_{c_{22}}$, $f_3(x,z)$ the terms $a_{c_{23}}$ through $a_{c_{33}}$, $zf_4(x,Y)$ the terms $a_{c_{34}}$ through $a_{c_{36}}$, and $xf_5(Y,z)$ the term $a_{c_{37}}$. As the $zf_4(x,Y)$ and $xf_5(Y,z)$ may be found to be extremely small, they may be discarded, leaving only the terms $f_1(x,Y)$, $f_2(Y,z)$, $f_3(x,z)$ for further consideration.

Equation (9) may then be rewritten:

$$c = f_{c_1}(x,Y) + {}_{c_2}(Y,z) + f_{c_3}(x,z) \quad (10)$$

where the first, second and third voltages $f_{c_1}(x,Y)$, $f_{c_2}(Y,z)$ and $f_{c_3}(x,z)$, respectively, are represented by the first, second and third graphs in FIGS. 3*a*, 3*b* and 3*c*, respectively, for the cyan color.

The transform for color magenta $m$ is:

$$m=a_{m1}x+a_{m2}x^2+a_{m3}x^3+a_{m4}x^4+a_{m5}xY+a_{m6}x^2Y+a_{m7}xY^2 \qquad (11)$$
$$+a_{m8}x^2Y^2+a_{m9}x^3Y+a_{m10}xY^3+a_{m11}x^2Y^2+a_{m12}Y+a_{m13}Y^2 \qquad (12)$$
$$+a_{m14}Y^3+a_{m15}Y^4+a_{m16}Yz+a_{m17}Y^2z+a_{m18}Yz^2+a_{m19}Y^2z^2 \qquad (13)$$
$$+a_{m20}Y^3z+a_{m21}Yz^3+a_{m22}Y^2z^2+a_{m23}z+a_{m24}z^2+a_{m25}z^3 \qquad (14)$$
$$+a_{m26}z^4+a_{m27}xz+a_{m28}xz^2+a_{m29}x^2z+a_{m30}x^2z^2+a_{m31}x^3z \qquad (15)$$
$$+a_{m32}xz^3+a_{m33}x^2z^2+a_{m34}xYz+a_{m35}x^2Yz+a_{m36}xY^2z \qquad (16)$$
$$+a_{m37}xYz^2 \qquad (17)$$

After all of the coefficients in the foregoing equations are determined, the transform may be laid out in two dimensional form and rewritten as follows:

$$m=f_1(x,Y)+f_2(Y,z)+f_3(x,z)+zf_4(x,Y)+xf_5(Y,z) \qquad (18)$$

where $f_1(x,Y)$ contains the terms $a_{m_1}$ through $a_{m_{11}}$, $f_2(Y,z)$ the terms $a_{m_{12}}$ through $a_{m_{22}}$, $f_3(x,z)$ the terms $a_{m_{23}}$ through $a_{m_{33}}$, $zf_4(x,Y)$ the terms $a_{m_{34}}$ through $a_{m_{36}}$, and $xf_5(Y,z)$ the term $a_{m_{37}}$. As the terms $zf_4(x,Y)$ and $xf_5(Y,z)$ may be found to be extremely small, they may be discarded, leaving only the terms $f_1(x,Y)$, $f_2(Y,z)$ and $f_3(x,z)$ for further consideration.

Equation (18) may then also be rewritten:

$$m=f_{m_1}(x,Y)+_{m_2}(Y,z)+f_{m_3}(x,z) \qquad (19)$$

where first, second and third voltages $f_{m_1}(x,Y)$, $f_{m_2}(Y,z)$, $f_{m_3}(x,z)$, respectively represent first, second and third graphs, not shown, but similar to the graphs in FIGS. *3a*, *3b* and *3c* for the magenta color $m$.

The transform for color yellow $y$ is:

$$y=a_{y1}x+a_{y2}x^2+a_{y3}x^3+a_{y4}x^4+a_{y5}xY+a_{y6}x^2Y+a_{y7}xY^2 \qquad (20)$$
$$+a_{y8}x^2Y^2+a_{y9}x^3Y+a_{y10}xY^3+a_{y11}x^2Y^2+a_{y12}Y+a_{y13}Y^2 \qquad (21)$$
$$+a_{y.4}Y^3+a_{y15}Y^4+a_{y16}Yz+a_{y17}Y^2z+a_{y18}Yz^2+a_{y19}Y^2z^2 \qquad (22)$$
$$+a_{y20}Y^3z+a_{y21}Yz^3+a_{y22}Y^2z^2+a_{y23}Z+a_{y24}Z^2+a_{y25}Z^3 \qquad (23)$$
$$+a_{y26}z^4+a_{y27}xz+a_{y28}xz^2+a_{y29}x^2z+a_{y30}x^2z^2+a_{y31}x^3z \qquad (24)$$
$$+a_{y32}xz^3+a_{y33}x^2z^2+a_{y34}xYz+a_{y35}x^2Yz+a_{y36}xY^2z \qquad (25)$$
$$+a_{y37}xYz^2 \qquad (26)$$

After all of the coefficients in the foregoing equations are determined, the transform may be laid out in two dimensional form and rewritten:

$$y=f_1(x,Y)+f_2(Y,z)+f_3(x,z)+zf_4(x,Y)+xf_5(Y,z) \qquad (27)$$

where $f_1(x,Y)$ contains the terms $a_{y_1}$ through $a_{y_{11}}$, $f_2(Y,z)$ the terms $a_{y12}$ through $a_{y22}$, $f_3(x,z)$ the terms $a_{y_{23}}$ through $a_{y_{33}}$, $zf_4(x,Y)$ the terms $a_{Y_{34}}$ through $a_{Y_{36}}$, and $xf_5(Y,z)$ the term $a_{Y_{37}}$. As the terms $zf_4(x,Y)$ and $xf_5(Y,z)$ may be found to be extremely small, they may be discarded, leaving only the terms $f_1(x,YA)$, $f_2(Y,z)$ and $f_3(x,z)$ for further consideration.

Equation (27) may then be rewritten:

$$Y=f_{y_1}(x,Y)+_{y_2}(Y,z)+f_{Y_3}(x,z) \qquad (28)$$

where the first, second and third order voltages $f_{y_1}(x,Y)$, $f_{y_2}(Y,z)$ and $f_{y_3}(x,z)$, respectively, represent first, second and third graphs, not shown, but similar to the graphs in FIGS. *3a*, *3b* and *3c* for the yellow color $y$.

The values for $a_{c_n}$, $a_{m_n}$ and $a_{y_n}$ are found empirically as previously noted. A digital computer is fed numerous individual datum points of the transform in tabular form, which points may be found experimentally, and programmed to find a set of coefficients that makes the mathematical form of the transform correspond with the empirical form, using the technique of least squares. Once all of the coefficients are determined, the respective transforms for the values $a_{c_n}$, $a_{m_n}$ and $a_{y_n}$ are laid out in two dimensional form as hereinbefore indicated in equations (10), (19) and (28).

A second step in the operation of the invention is to graph each of the functions $f_1(x,Y)$, $f_2(Y,z)$ and $f_3(x,z)$ for each of the equations (10), (19) and (28) on a photographic film in the manner of the first step explained hereinbefore and further referred to below.

It is also understood that while each of the graphs in FIGS. *3a*, *b* and *c* consists of $(8)^2$ equal squares, this number is only used for the purpose of this description, $(20)^2$ equal squares being more suitable for the purpose of the invention.

The function of the first voltage $f_{c_1}(x,Y)$ in equation (10) is encoded as a graph on the film in FIG. *3a* in such manner that the transmission of light through the film at point $P(x_1,Y_1)$ is equal to the normalized value of the latter function of $x=x_1$ and $Y=y_1$, in accordance with the light modulation technique previously described. Accordingly, the successive squares in the graph of FIG. *3a* are encoded to transmit varying intensities of white light therethrough as initially controlled by the programmed digital computer as hereinbefore stated. The functions of the voltages $f_{c_2}(Y,z)$ and $f_{c_3}(x,z)$, respectively, in equation (10) are encoded in the successive squares of the graphs on the films in FIGS. *3b* and *3c*, respectively, to transmit varying intensities of white light therethrough as initially controlled by the programmed digital computer. The developed graphed films of FIGS. *3a*, *b* and *c* constituting the first group thereof are mounted on the external surfaces of the screens of tubes 35, 36 and 37, respectively, with the Y, $x$ and $z$ coordinates disposed as indicated thereon and previously mentioned. In other words, each square of each of the transform films is encoded with a predetermined degree of transparency represented by a corresponding number of oblique lines as indicated in FIGS. *3a*, *b* and *c* for the purpose of this description as stated below.

The functions $f_m(x,Y)$, $f_{m_2}(Y,z)$ and $f_m(x,z)$ and $f_{y_1}(x,Y)$, $f_{y_2}(Y,z)$ and $f_{y_3}(x,z)$ in equations (19) and (28), respectively, are similarly encoded with different degrees of transparencies in the successive squares of each film in the second and third groups of photographic film, not shown, each latter group including three discrete films in the manner of the graphed films in FIGS. *3a*, *b* and *c*. Each film in the second and third groups thereof transmits varying intensities of white light therethrough as initially controlled by the programmed digital computer as stated above. Although not shown in detail, it is understood that the two additional film groups are mounted on the external surfaces of the screens of tubes 38 through 43 in such manner that the transform films encoded with the voltage functions $f_{m_1}(x,Y)$, $f_{m_2}(Y,z)$ and $f_{m_3}(x,z)$ are mounted on the screens of the tubes 38, 39 and 40, respectively, while the transform films encoded with the voltage functions $f_{y_1}(x,Y)$, $f_{y_2}(Y,z)$ and $f_{y_3}(x,z)$ are attached to the screens of the tubes 41, 42 and 43, respectively, with the $x$, y and $z$ coordinates disposed as indicated on the respective transform films in the manner previously discussed regarding the film in FIGS. *3a*, *b* and *c*. Again, each square in each of the six additional transform films, not shown, is encoded with a predetermined degree of transparency represented by a corresponding number of oblique lines in the manner of FIGS. 3*a*, *b* and *c* for the purpose hereinafter mentioned.

In the operation of the transform films mounted on the screens of the respective tubes 35 through 43 in accordance with the invention in FIG. 1 as above mentioned, rotation of the mandrel serves to move the light from source 15 on the multicolor member 11 to reflect the continuously varying intensities of red, blue and green light rays 24 therefrom for translation into the voltages *x*, Y and *z*, respectively, as previously explained. These voltages are simultaneously applied to the horizontal and vertical deflection plates of the respective tubes 35 through 43 for moving the white spots having constant brightness and associated with the respective electron beams in coordinate patterns on the screens of the latter tubes while at the same time the films mounted on the respective screens transmit varying intensities of white light therethrough due to the varying degrees of the transparencies of the successive coordinate squares of the respective films.

It is now recalled from the previous explanation that the successive squares of the transform films attached to the screens of the respective tubes 35 through 43 were initially encoded with varying degrees of transparencies via variable light sources and a digital computer to transmit predetermined intensities of white light therethrough. These continuously varying intensities of white light serve to produce the voltages *y*, *m* and *c* of continuously varying magnitudes for continuously varyingly actuating the variable white light sources 21, 20 and 19, respectively, as previously pointed out.

As a consequence of the different combinations of two different ones of the voltages *x*, Y and *z* continuously varying in magnitudes and applied to the deflecting plates of the tubes 35, 36 and 37, the transform films shown in FIGS. 3*a* *b* and *c* and mounted on the screens of the latter tubes are caused to transmit correspondingly varying intensities of white light therethrough to represent the first, second and third voltages $f_{y_1}(x,Y)+f_{y_2}(Y,z)+f_{y_3}(x,z)$, respectively, to enable the production of the voltage *y* of continuously varying magnitude. This continuously varying magnitude voltage continuously actuates the variable light source 21 to shine white light of correspondingly varying intensity onto the light-sensitive element to represent thereon the varying densities of the yellow ink that are required to duplicate the varying densities of the green color in the scanned member. As the electron beams of tubes 35, 36 and 37 were initially provided with constant intensities to produce white spots of constant brightness on the screens thereof, it is apparent that the varying light intensities transmitted through the coordinate squares of the transform films in FIGS. 3*a*, *b* and *c* attached to the respective latter tube screens are functions of the combinations of the two different ones of the voltages *x*, Y and *z* indicated in FIGS. 1 and 3*a*, *b* and *c*.

At the same time and in a similar manner the different combinations of two different ones of the voltages *x*, Y and *z*, of continuously varying magnitudes applied to the deflection plates of the tubes 38, 39 and 40 cause the transform films representing the first, second and third voltages $f_{m_1}(x,Y)+f_{m_2}(Y,z)+f_{m_3}(x,z)$ and attached to the screens thereof to transmit correspondingly varying intensities of white light therethrough to enable the production of the voltage *m* of continuously varying magnitude. This continuously varying magnitude voltage continuously actuates the variable light source 20 to shine white light of correspondingly varying intensity onto the light-sensitive element 13 to represent thereon the varying densities of the magenta ink required to duplicate the varying densities of the red color in the scanned member. As the electron beams of tubes 38, 39 and 40 were initially provided with constant intensities to produce white spots of constant brightness on the screens thereof, it is evident that the varying light intensities transmitted through the coordinate squares of the transform films attached to the latter tube screens are functions of the combinations of two different ones of the voltages *x*, Y and *z* indicated in FIG. 1.

Also, at the same time and in a similar manner the combinations of two different ones of *x*, Y and *z* voltages of continuously varying magnitudes applied to the deflection plates of the tubes 41, 42 and 43 cause the transform films representing the first, second and third voltages $f_{c_1}(x,Y)$, $f_{c_2}(Y,z)$ and $f_{c_3}(x,z)$, respectively, and attached to the screens of the respective latter tubes to transmit correspondingly varying intensities of white light therethrough to enable the production of the voltage *c* of continuously varying magnitude. This continuously varying magnitude voltage continuously actuates the variable light source 19 to shine white light of correspondingly varying intensity onto the light-sensitive element 12 to represent thereon the varying densities of the blue color of the scanned member. As the electron beams in tubes 41, 42 and 43 were initially provided with constant intensities to produce white spots of constant brightness on the screens thereof, it is apparent that the varying light intensities transmitted through the transform films attached to the respective latter tube screens are functions of the combinations of the two different ones of the voltages *x*, Y and *z* indicated in FIG. 1.

It is understood that the light-sensitive elements 12, 13 and 14 after exposure to the varying intensities of white light derived from the variable light sources 19, 20 and 21, respectively, as previously explained are available to produce multicolor-printing plates in a manner well known in the multicolor printing art.

It is thus seen that the simultaneous and continuous solutions for the varying in magnitude and voltages representing the varying densities of the yellow, magenta and cyan colors of the printing inks, as encoded in the nine transform films included in the analog color computer embodied in the light-responsive printing system of FIG. 1, enables the performance of at least a million calculations per second. This high-speed computer provides a useful device for association with other high-speed equipment hereinbefore identified as presently available in the art to permit the design of high-speed color correction circuits for use with color scanners in color copying equipment.

It is understood that the invention herein is described in specific respects for the purpose of this disclosure. It is also understood that such respects are merely illustrative of the application of the invention. Numerous other arrangements may be devised by those skilled in the art without departing from the spirit and scope of the invention.

What is claimed is:

1. A light-responsive transform computer comprising, in combination:

a plurality of means actuable to display a plurality of discrete light spots of constant brightness in first preselected patterns;

a plurality of means having multiplicities of subdivisions arranged in a plurality of second preselected patterns and encoded with successively predetermined different degrees of light transparencies in such manner that a summation of said multiplicities of different degrees of light transparencies represents an additional light varying in intensity; said display means and said subdivision means mounted in such juxtapositions as to locate said first and second patterns in mutually coextensive relationship;

means providing a plurality of pairs of different voltages representing different information for actuating said display means to display said spots in said first patterns to cause said subdivision means to transmit discrete groups of light rays varying in intensities as each of said light spots is displayed on each of said subdivisions in turn on one of said subdivision means;

a plurality of photosensor means light coupled to said plurality of subdivision means for translating said groups of light rays as received therefrom into said additional light varying in intensity;

and light-sensitive means at least partially light-coupled to said photosensor means for recording said additional light varying in intensity as received therefrom.

2. The computer according to claim 1 in which said plurality of spot display means includes a plurality of cathode ray oscilloscope tubes, each having a screen, a cathode, and horizontal and vertical deflection plates; said cathodes activated by a regulated voltage to provide said spots with constant brightness on said screens; said plates energized by said pairs of voltages to display said last-mentioned spots in said first patterns on said screens.

3. The computer according to claim 1 in which said plurality of subdivision means includes a plurality of photographic films, each provided with a multiplicity of said subdivisions arranged in one of said second patterns; said subdivisions of each of said films encoded with said successively predetermined different degrees of light transparencies in such manner that a summation of said different degrees of light transparencies of said plurality of films represents said additional light varying in intensity.

4. The computer according to claim 1 in which said light-sensitive means includes a photographic film.

5. The computer according to claim 1 in which said light-sensitive means includes a selenium surface.

6. The computer according to claim 1 in which said light-sensitive means includes a silver halide surface.

7. A light-responsive transform computer comprising, in combination:

- means for producing a plurality of different voltages representing different information;
- a plurality of cathode-ray oscilloscope tubes, each having a cathode, a screen and horizontal and vertical deflection plates; said cathodes activated by a regulated voltage to provide spots of light of constant brightness on said screens in such manner that each screen is provided with one light spot; said plates activated by said voltages in different combinations of two thereof to display said light spots on said screens in first preselected patterns;
- a plurality of photographic films, each containing a multiplicity of subdivisions arranged in a second preselected pattern; said screens and said films disposed in such juxtapositions that each screen light spot pattern is coextensive with one film subdivisions pattern; said subdivisions of each film encoded with successively different degrees of light transparencies in such manner that a summation of said last-mentioned light transparencies of said films represents an additional light varying in intensity; said light spots as displayed on said screens causing said films to transmit therethrough a plurality of groups of light rays varying in intensities as each of said light spots is displayed on each of said subdivisions in turn on one of said films;
- a plurality of photosensor means light-coupled to said plurality of subdivisions means for translating said groups of light rays varying in intensities as received therefrom into said additional light varying in intensity;
- and light-sensitive means at least partially light-coupled to said photosensor means for recording said additional light varying in intensity as received therefrom.

8. In combination in a light-responsive transform computer:

- a plurality of cathode-ray oscilloscope tubes, each including a cathode, a screen and horizontal and vertical deflection plates; said cathodes activated by a regulated voltage to provide light spots of constant brightness on said screens, one light spot on each screen; said plates activated by pairs of different other voltages representing different information to display said light spots on said screens in first preselected patterns;
- and a plurality of photographic films, each formed with a multiplicity of subdivisions arranged in a second preselected pattern; said screens and films disposed in such juxtaposition that each screen light spot pattern is coextensive with one film subdivisions pattern; each of said films encoded with successively predetermined different degrees of light transparencies in such manner that a summation of said multiplicities of different degrees of light transparencies of said films represents an additional light varying in intensity; said light spots as displayed on said screens causing said films to transmit therethrough a plurality of groups of light rays varying in intensities as each of said light spots is displayed on each of said subdivisions in turn on one of said films.

9. A high-speed light-responsive system of printing, comprising:

- a member having a plurality of different colors, each varying in density;
- light means providing a spot of white light for scanning said member to derive therefrom a plurality of output voltages, each corresponding to one of said colors;
- a plurality of light-sensitive elements synchronized with said scanning spot;
- a plurality of sources of additional white light variable in intensity and actuable by other voltages variable in magnitude to shine said additional light varying in corresponding varying intensities onto said elements for representing thereon varying densities of a plurality of different color inks required to duplicate said member varying density colors as said light spot scans said member; each source actuated by one other voltage;
- and a light-responsive transform computer connected between outputs of said light means and inputs of said light sources and activated by said derived voltages to produce said other voltages, including:
- a plurality of groups of light-transmitting areas, each area containing a multiplicity of subdivisions encoded with successively predetermined different degrees of light transparencies in such manner that a summation of said subdivision different degrees of light transparencies in each area group represents one of said other voltages; said subdivisions in turn in each of said areas in each of said area groups activated in response to different combinations of two of said derived voltages to transmit therethrough further white light varying in intensities for producing said other voltages.

10. The system according to claim 9 in which said light means includes:

- a mandrel having said member and said elements mounted in side-by-side relation on a periphery thereof;
- a supply of light;
- means for shining said supply of light as said light spot to scan said member to reflect therefrom different color light rays corresponding to said member different colors;
- and light filter means energized by said reflected different color light rays to derive said corresponding voltages therefrom.

11. The system according to claim 9 in which said light-responsive transform computer includes a plurality of groups of cathode ray tubes, each tube including cathode, a screen and horizontal and vertical deflection plates; said cathodes activated by a regulated voltage to provide light spots of constant brightness on said screens; each light-transmitting area of each area group mounted in proximity of said screen of one tube in each tube group; said deflection plates of each tube in each tube group energized by said different combinations of two of said derived voltages for supplying said further light to activate each of said area subdivisions in turn in each of said areas in each of said area groups to transmit said further light varying in intensities.

12. The system according to claim 11 in which each of said areas comprises a photographic film containing said multiplicity of subdivisions arranged in a coordinate form; each film mounted in proximity of one tube screen to dispose said coordinate subdivisions in accordance with said voltages of one of said different voltage combinations; each of said different voltage combinations energizing said deflection plates of one of said tubes to move said further light on said film at said screen of said last-mentioned one tube in a coordinate pattern coextensive with said film subdivisions coordinate form.

13. The system according to claim 12 in which said transform computer includes a plurality of groups of multiplier phototubes; each latter group at least partially light coupled to one of said film groups for translating said further light varying in intensity transmitted therethrough into a plurality of discrete second output voltages representing one of said other voltages.

14. The system according to claim 13 in which said transform computer includes a plurality of voltage adders, each adder having inputs connected to outputs of one of said phototube groups and outputs connected to an input of one of said sources for combining said plurality of said second output voltages derived therefrom to form one of said other voltages.

15. The system according to claim 9 in which said plurality of light-sensitive elements includes a plurality of light-sensitive second films, each light-coupled to one of said light sources.

16. The system according to claim 9 in which said plurality of light-sensitive elements includes a plurality of selenium surfaces, each light coupled to one of said light sources.

17. The system according to claim 9 in which said plurality of light-sensitive elements includes a plurality of halide surfaces, each light-coupled to one of said light sources.

18. The system according to claim 9, in which said light-responsive transform computer includes:

a plurality of groups of cathode-ray tubes; each having a screen, a cathode, and horizontal and vertical deflection plates; said cathodes energized by a regulated voltage to provide second white light spots of constant brightness on said screens; each of said second light spots provided on one of said screens;

and each of said areas comprises a photographic film containing a multiplicity of subdivisions arranged in a coordinate form; each film positioned in proximity of one tube screen to dispose said coordinate subdivisions in accordance with said voltages of one of said different voltage combinations; each of said different voltage combinations energizing said deflection plates of one of said tubes to move one of said second light spots on said film attached to said screen of said last-mentioned one tube in a coordinate pattern coextensive with said film subdivision coordinate form.

19. The system according to claim 18 in which said light-responsive transform computer includes:

a plurality of groups of multiplier phototubes, each latter group at least partially light coupled to one of said film groups to provide a plurality of discrete output voltages varying in magnitude in correspondence with said further light varying in intensity as transmitted through said films of said last-mentioned film group;

and a plurality of adders, each having inputs connected to outputs of one of said phototube groups for combining the discrete output voltages of said last-mentioned one phototube group to form one of said other voltages.

20. A light-responsive system of printing, comprising:

a member having red, green and blue colors varying in density;

light means providing a spot of white light for scanning said members to reflect red, green and blue light rays therefrom;

light filter means converting said red, green and blue light rays into a plurality of discrete output voltages, each corresponding to one of said reflected light ray colors;

a plurality of light-sensitive elements synchronized with said scanning light spot;

a plurality of sources of additional white light variable in intensity; said sources activated by a plurality of input other voltages variable in magnitude to shine said additional light varying in intensities onto said respective elements for representing thereon varying densities of printing inks of magenta, yellow and cyan colors required to duplicate said member red, green and blue color densities, respectively, each latter source activated by one of said input other voltages;

and a light-responsive transform computer connected between outputs of said light filter means and inputs of said light sources and activated by said converted voltages to produce said input other voltages, including:

a plurality of groups of cathode ray oscilloscope tubes; each tube having a screen, a cathode and horizontal and vertical deflection plates; said cathodes energized by a regulated voltage to provide second white light spots of constant brightness on said screens; each of said second light spots provided on one of said screens; said deflection plates of said tubes in each tube group energized by a different combination of two of said converted voltages to move said second white spots in coordinate patterns on said screens in each tube group;

a plurality of groups of photographic films; each latter film containing a multiplicity of discrete subdivisions arranged in a coordinate form and encoded with successively predetermined different degrees of light transparencies in such manner that a summation of said subdivisions of different degrees of light transparencies in each of said film groups represents one of said input other voltages; each film mounted in proximity of said screen of one tube in each tube group to dispose said coordinate form subdivisions in accordance with said two converted voltages of one of said combinations thereof and in coextensive relation with said second light spot coordinate pattern on said last-mentioned screen; each film group transmitting therethrough three discrete groups of light rays varying in intensities as emanating from second light spots on said screens on which said latter film group is mounted as said last-mentioned spots are moved in said coordinate patterns on each of said subdivisions in turn on each film of each film group;

a plurality of groups of multiplier phototubes, each latter group containing three phototubes having inputs at least partially light-coupled to one of said film groups for translating said groups of light rays varying in intensities as transmitted therethrough into three discrete output voltages varying in corresponding magnitudes;

and a plurality of voltage adders, each having inputs connected to outputs of one latter phototube group for combining said voltages in said latter outputs to produce one of said input other voltages for activating one of said light sources.

21. A light-responsive system of printing, comprising:

a member having red, green and blue colors varying in density;

three light-sensitive elements;

a mandrel supporting said member and elements in side-by-side relation on a periphery thereof;

light means providing a spot of white light for scanning said member to reflect red, green and blue light rays therefrom as said mandrel is rotated;

three light filter means light-coupled to said member for converting said reflected light rays into a plurality of voltages; each filter means converting one color of said latter light rays into one of said latter voltages;

three sources of additional white light variable in intensity; each of said sources activated by one of three other voltages variable in magnitude to shine said additional light varying in intensity onto one of said printing plate surfaces for representing thereon varying densities of printing inks of magenta, yellow and cyan colors required to duplicate said densities of said member red, green and blue colors as scanned;

and a high-speed light-responsive transform computer connected between outputs of said three filter means and inputs of said three light sources and activated by said converted voltages to produce said three other voltages at the same time, including:

three groups of cathode-ray oscilloscope tubes; each latter group containing three tubes; each tube having a cathode, a screen, and horizontal and vertical deflection plates; said cathodes energized by a regulated voltage to provide second white light spots of constant brightness on said screens, each latter spot provided on one latter screen;

said deflection plates of said tubes in each tube group energized by different combinations of two of said converted voltages to move said second light spots in coordinate patterns on said screens in each tube group;

three groups of photographic films, each latter group consisting of three films; each latter film containing a multiplicity of discrete subdivisions arranged in a coordinate form and encoded with successively predetermined different degrees of light transparencies in such manner that a summation of said subdivisions of different degrees of light transparencies in each film group represents one of said other voltages; each film of each film group mounted in proximity of said screen of one tube in each tube group to dispose said coordinate form areas in accordance with said two converted voltages of one of said combinations thereof and in coextensive relation with said second light spot coordinate pattern on said last-mentioned screen; said three films of each film group transmitting therethrough three discrete groups of light rays varying in intensities as emanating from said second light spots on said screens on which said latter film group is mounted as said last-mentioned spots are moved in said coordinate patterns on each of said subdivisions in turn on each film of each film group;

three groups of multiplier phototubes, each latter group containing three phototubes having inputs at least partially light-coupled to one of sad film groups for translating said groups of light rays varying in intensities as transmitted therethrough into three discrete output voltages varying in corresponding magnitudes;

and three voltage adders, each having inputs connected to outputs of one latter phototube group for combining said voltages in said latter outputs to produce one of said other voltages.

* * * * *